United States Patent
Mizumoto

(10) Patent No.: US 10,331,397 B2
(45) Date of Patent: Jun. 25, 2019

(54) REPRODUCTION APPARATUS

(71) Applicant: KYOCERA CORPORATION, Kyoto (JP)

(72) Inventor: Akira Mizumoto, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/957,767

(22) Filed: Apr. 19, 2018

(65) Prior Publication Data
US 2018/0239579 A1  Aug. 23, 2018

Related U.S. Application Data

(63) Continuation of application No. PCT/JP2016/080521, filed on Oct. 14, 2016.

(30) Foreign Application Priority Data

Oct. 28, 2015 (JP) ................. 2015-211837

(51) Int. Cl.
| | | |
|---|---|---|
| G06F 1/16 | (2006.01) | |
| G06F 3/16 | (2006.01) | |
| H04N 21/422 | (2011.01) | |
| G06F 3/01 | (2006.01) | |
| H04R 3/00 | (2006.01) | |
| G06F 16/00 | (2019.01) | |

(52) U.S. Cl.
CPC ............... G06F 3/16 (2013.01); G06F 1/163 (2013.01); G06F 3/015 (2013.01); G06F 16/00 (2019.01); H04N 21/42201 (2013.01); H04R 3/00 (2013.01); H04R 2499/13 (2013.01)

(58) Field of Classification Search
CPC . G06F 3/16; G06F 3/162; G06F 3/165; G06F 3/167; G06F 17/30; G06F 1/163; G06F 3/015; H04N 21/44218; H04N 21/4532; H04N 21/422; H04N 21/42201; H04N 21/4756; H04N 21/4751
See application file for complete search history.

(56) References Cited

U.S. PATENT DOCUMENTS

| | | | | |
|---|---|---|---|---|
| 2001/0040591 A1* | 11/2001 | Abbott | ..................... | G06F 1/163 |
| | | | | 715/700 |
| 2005/0097595 A1* | 5/2005 | Lipsanen | ................ | G06F 21/10 |
| | | | | 725/25 |
| 2006/0080357 A1* | 4/2006 | Sakai | ..................... | H04H 60/45 |
| 2006/0277474 A1* | 12/2006 | Robarts | .................. | G06Q 10/10 |
| | | | | 715/745 |

(Continued)

FOREIGN PATENT DOCUMENTS

| | | |
|---|---|---|
| JP | 2006-99195 A | 4/2006 |
| JP | 2011-141492 A | 7/2011 |

(Continued)

*Primary Examiner* — Andrew C Flanders
(74) *Attorney, Agent, or Firm* — Duane Morris LLP

(57) ABSTRACT

A state memory can store states of a plurality of users who are sleeping or awake. At least one processor can set priorities among the plurality of users. The at least one processor can select one user as a target user from among the plurality of users based on the states of the plurality of users and the priorities among the plurality of users. The at least one processor can reproduce a content in accordance with the target user.

16 Claims, 19 Drawing Sheets

(56) References Cited

U.S. PATENT DOCUMENTS

| | | | | |
|---|---|---|---|---|
| 2007/0142944 A1* | 6/2007 | Goldberg | ............. | G10H 1/0025 |
| | | | | 700/94 |
| 2008/0229215 A1* | 9/2008 | Baron | .................... | G06N 3/006 |
| | | | | 715/751 |
| 2009/0222392 A1* | 9/2009 | Martin | ................. | G11B 27/105 |
| | | | | 706/46 |
| 2010/0205541 A1* | 8/2010 | Rapaport | ................ | G06Q 10/10 |
| | | | | 715/753 |
| 2010/0220972 A1* | 9/2010 | Bryan | .................... | H04H 60/27 |
| | | | | 725/9 |
| 2011/0314388 A1* | 12/2011 | Wheatley | ............. | G11B 27/034 |
| | | | | 715/751 |
| 2012/0290950 A1* | 11/2012 | Rapaport | ................ | H04L 51/32 |
| | | | | 715/753 |
| 2013/0046755 A1* | 2/2013 | Svendsen | .......... | G06F 17/30749 |
| | | | | 707/722 |
| 2015/0067709 A1* | 3/2015 | Meredith | ............. | H04N 21/454 |
| | | | | 725/12 |

FOREIGN PATENT DOCUMENTS

| | | |
|---|---|---|
| JP | 2013-125531 A | 6/2013 |
| JP | 2014-6595 A | 1/2014 |
| JP | 2015-96413 A | 5/2015 |
| JP | 2015-114761 A | 6/2015 |
| JP | 2015-130907 A | 7/2015 |
| JP | 2015-150375 A | 8/2015 |

* cited by examiner

| WEARABLE TERMINAL ID |

| WEARABLE TERMINAL ID | STATE FLAG |

| USER NAME | WEARABLE TERMINAL ID | AGE | CONTENT ID | PRIORITY |
|---|---|---|---|---|
| A | 1 | 10 | X | 2 |
| B | 2 | 5 | Y | 1 |
| C | 3 | 38 | Z | 3 |
| D | 4 | 40 | W | 4 |
| E | 5 | 67 | P | 6 |
| F | 6 | 65 | Q | 5 |

| WEARABLE TERMINAL ID | PUT-ON FLAG | STATE FLAG |
|---|---|---|
| 1 | 0:ON | 0:AWAKE |
| 2 | 0:ON | 1:SLEEPING |
| 3 | 0:ON | 0:AWAKE |
| 4 | 0:ON | 0:AWAKE |

| WEARABLE TERMINAL ID | PUT-ON FLAG | STATE FLAG |
|---|---|---|
| 1 | 1:OFF |  |
| 2 | 0:ON | 1:SLEEPING |
| 3 | 0:ON | 0:AWAKE |
| 4 | 0:ON | 0:AWAKE |

| WEARABLE TERMINAL ID | PUT-ON FLAG | STATE FLAG |
|---|---|---|
| 2 | 0:ON | 1:SLEEPING |
| 4 | 0:ON | 0:AWAKE |

FIG.30

| USER NAME | WEARABLE TERMINAL ID | AGE | GENRE ID | PRIORITY |
|---|---|---|---|---|
| A | 1 | 10 | 1 (ANIMATION) | 2 |
| B | 2 | 5 | 1 (ANIMATION) | 1 |
| C | 3 | 38 | 2 (DRAMA) | 3 |
| D | 4 | 40 | 3 (NEWS) | 4 |
| E | 5 | 67 | 4 (LIVE SPORTS) | 6 |
| F | 6 | 65 | 2 (DRAMA) | 5 |

REPRODUCTION APPARATUS

CROSS-REFERENCE TO RELATED APPLICATION

The present application is a continuation based on PCT Application No. PCT/JP2016/080521 filed on Oct. 14, 2016, which claims the benefit of Japanese Application No. 2015-211837 filed on Oct. 28, 2015. PCT Application No. PCT/JP2016/080521 is entitled "Playback Device" and Japanese Application No. 2015-211837 is entitled "Reproduction Apparatus." The content of which is incorporated by reference herein in their entirety.

FIELD

The present disclosure relates to a reproduction apparatus.

BACKGROUND

An apparatus which can detect a sleep state of a user and automatically stop reproduction of a content such as music when the user fell asleep without stopping reproduction of the content has conventionally been known.

For example, a conventional apparatus can obtain state information indicating a state of a user, determine whether or not the user is sleeping based on the state information, and stop distribution of music information to the user when it determines that the user is sleeping.

SUMMARY

A reproduction apparatus in one embodiment includes a state memory configured to store states of a plurality of users who are sleeping or awake and at least one processor. The at least one processor is configured to set priorities among the plurality of users, select one user as a target user from among the plurality of users based on the states of the plurality of users and the priorities among the plurality of users, and reproduce a content in accordance with the target user.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 30 is a diagram showing exemplary user information.

DETAILED DESCRIPTION

An embodiment will be described below with reference to the drawings.

First Embodiment

Figure 1:
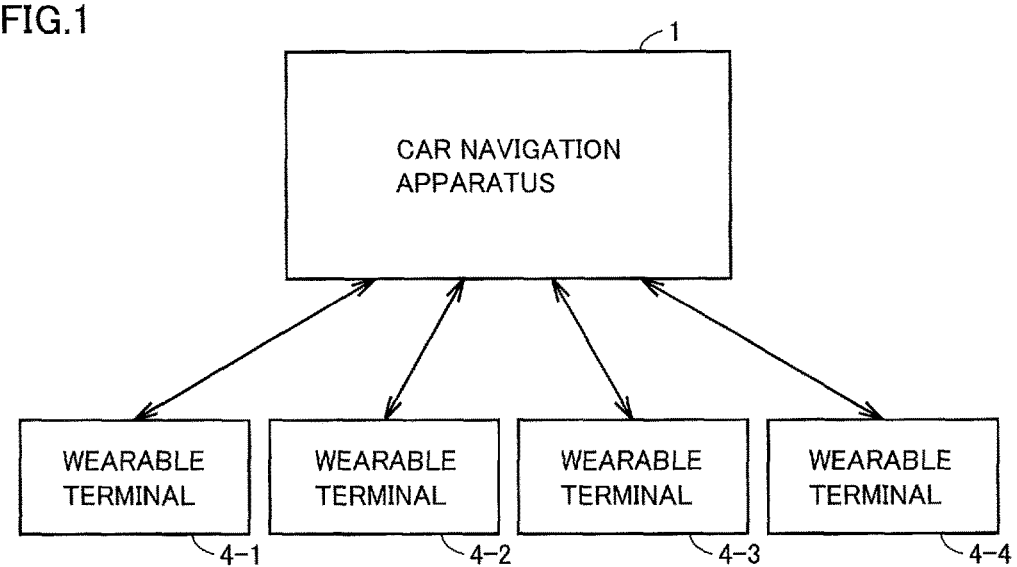
FIG. 1 is a diagram showing a content reproduction system in an embodiment.

FIG. 1 is a diagram showing a content reproduction system in an embodiment.

The content reproduction system includes a car navigation apparatus 1 and wearable terminals 4-1 to 4-4. Car navigation apparatus 1 performs a navigation function such as locating a current position of a vehicle and guiding the vehicle to a destination and a content reproduction function. In the description below, a set of components performing the content reproduction function included in car navigation apparatus 1 may also be called a content reproduction apparatus.

Car navigation apparatus 1 can reproduce a content. Examples of reproduced contents include video pictures and voice and sound recorded in a recording medium such as a digital versatile disk (DVD), a compact disk (CD), and a hard disk, video pictures and voice and sound provided in a real-time broadcast service such as an audio broadcast and a TV broadcast, and voice and sound provided in a real-time broadcast service such as a radio broadcast.

Wearable terminals 4-1 to 4-4 can be watch type apparatuses. Respective wearable terminals 4-1 to 4-4 are worn on bodies such as wrists of users A to D and can detect whether users A to D are sleeping or awake. Car navigation apparatus 1 can switch between contents to be reproduced in accordance with which of users A to D is sleeping or awake. Wearable terminals 4-1 to 4-4 may collectively be called a wearable terminal 4 below.

Figure 2:
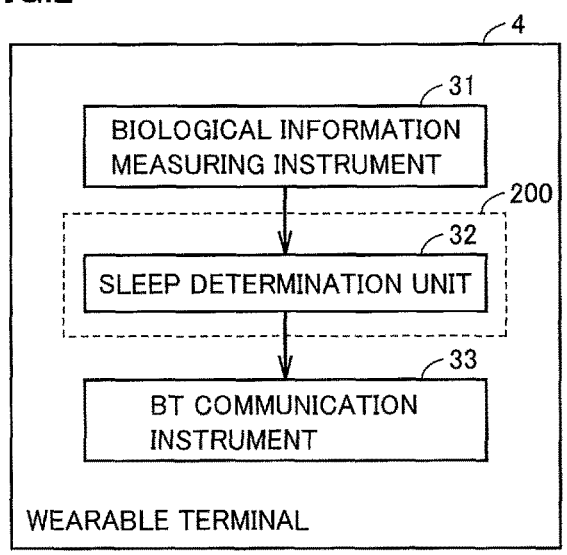
FIG. 2 is a diagram showing a configuration of a wearable terminal.

FIG. 2 is a diagram showing a configuration of wearable terminal 4.

Wearable terminal 4 includes a biological information measuring instrument 31, a sleep determination unit 32, and a BT communication instrument 33.

Sleep determination unit 32 can be a part of at least one processor 200. In accordance with various embodiments, at least one processor 200 may be implemented as a single integrated circuit (IC) or as multiple communicatively coupled IC's and/or discrete circuits. At least one processor 200 can be implemented in accordance with various known technologies. In one embodiment, at least one processor 200 includes one or more circuits or units configurable to perform one or more data computing procedures or processes, for example, by executing instructions stored in an associated memory. In another embodiment, at least one processor 200 may be firmware (such as a discrete logic component) configured to perform one or more data computing procedures or processes. In accordance with various embodiments, at least one processor 200 may include one or more processors, controllers, microprocessors, microcontrollers, application specific integrated circuits (ASICs), digital signal processors, programmable logic devices, field programmable gate arrays, or any combination of these devices or structures, or other known devices and structures, to perform the functions described below.

Biological information measuring instrument 31 can measure biological information such as a pulse, a temperature, and a blood pressure of a user with a certain period T1. While a user is not wearing wearable terminal 4, biological information is not measured.

When biological information is measured, sleep determination unit 32 can determine a state of a user based on the measured biological information. For example, sleep determination unit 32 can determine whether a user is sleeping or awake based on a pulse of the user.

BT communication instrument 33 can communicate with car navigation apparatus 1 under a Bluetooth® communication scheme when wearable terminal 4 is turned on and is within a coverage area of communication with car navigation apparatus 1.

Figures 3, 4, 5:
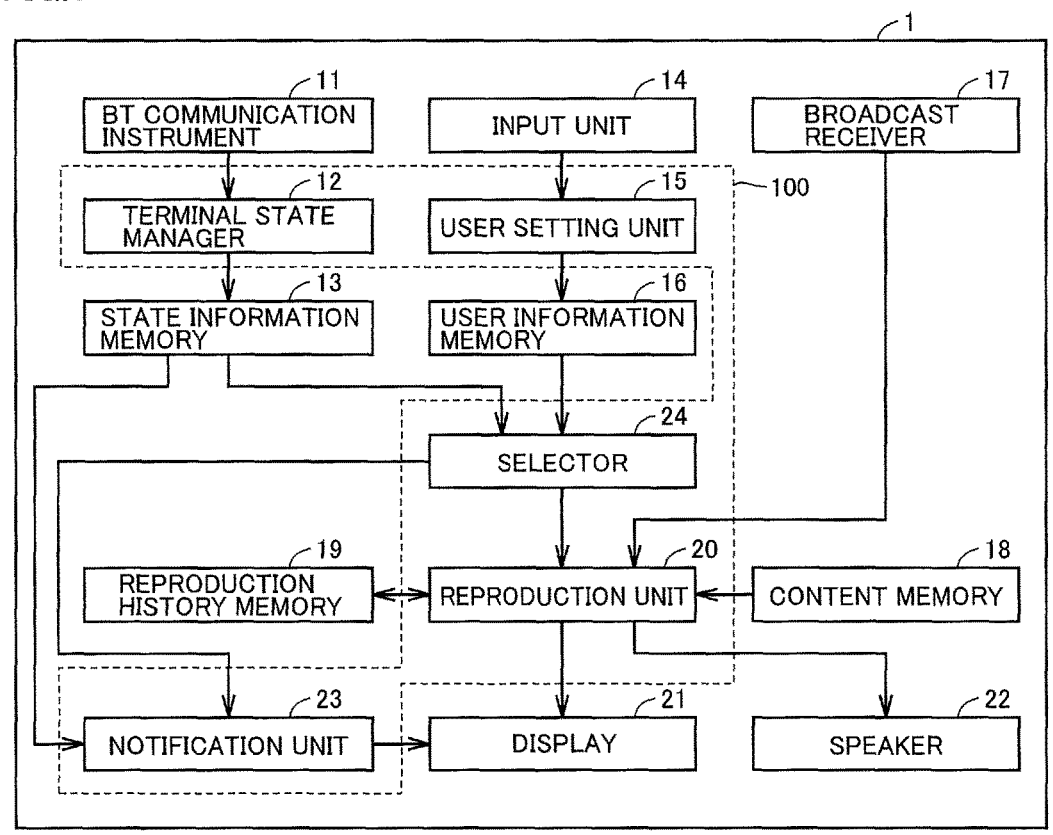
FIG. 3 is a diagram showing information S1.
FIG. 4 is a diagram showing information S2.
FIG. 5 is a diagram showing a configuration of a car navigation apparatus.

BT communication instrument 33 can transmit information including an ID of a wearable terminal (hereinafter information S1) as shown in FIG. 3 with a certain period T2, where relation of T2<T1 is satisfied.

When a state of a user is determined, BT communication instrument 33 can transmit with certain period T1, information including the ID of the wearable terminal and a state flag indicating whether the user is sleeping or awake (hereinafter information S2) as shown in FIG. 4. While the user is not wearing wearable terminal 4, information S2 is not transmitted.

Timing of transmission of information S1 and information S2 from wearable terminals 4-1 to 4-4 to car navigation apparatus 1 is assumed to be different.

FIG. 5 is a diagram showing a configuration of car navigation apparatus 1.

Car navigation apparatus 1 includes an input unit 14, a user setting unit 15, a user information memory 16, a broadcast receiver 17, a BT communication instrument 11, a terminal state manager 12, a state information memory 13, a content memory 18, a display 21, a speaker 22, a reproduction unit 20, a reproduction history memory 19, a notification unit 23, and a selector 24. FIG. 3 does not show a feature for guiding a vehicle.

User setting unit 15, terminal state manager 12, reproduction unit 20, notification unit 23, and selector 24 can be a part of at least one processor 100. In accordance with various embodiments, at least one processor 100 may be implemented as a single integrated circuit (IC) or as multiple communicatively coupled IC's and/or discrete circuits. At least one processor 100 can be implemented in accordance with various known technologies. In one embodiment, at least one processor 100 includes one or more circuits or units configurable to perform one or more data computing procedures or processes, for example, by executing instructions stored in an associated memory. In another embodiment, at least one processor 100 may be firmware (such as a discrete logic component) configured to perform one or more data computing procedures or processes. In accordance with various embodiments, at least one processor 100 may include one or more processors, controllers, microprocessors, microcontrollers, application specific integrated circuits (ASICs), digital signal processors, programmable logic devices, field programmable gate arrays, or any combination of these devices or structures, or other known devices and structures, to perform the functions described below.

Input unit 14 can accept an input from a user. According to various embodiments, input unit 14 may be implemented using any input technology or device known in the art such as, for example, a QWERTY keyboard, a pointing device (e.g., a mouse), a joy stick, a stylus, a touch screen display panel, a key pad, one or more buttons, etc., or any combination of these technologies.

Display 21 can show video pictures and a message which can be obtained by reproduction of a movie by reproduction unit 20. According to various embodiments, display 21 may be implemented using any representation technology or device known in the art such as a liquid crystal display, an organic electroluminescence (EL) display, or an inorganic EL display, or any combination of these technologies.

Speaker 22 can emit voice and sound obtained by reproduction of a movie by reproduction unit 20 and voice and sound obtained by reproduction of music numbers.

Broadcast receiver 17 can receive broadcast data on a selected channel of a TV broadcast. The broadcast data includes video pictures and voice and sound. Broadcast receiver 17 can receive broadcast data on a selected channel of a radio broadcast. The broadcast data includes voice and sound. Broadcast receiver 17 is implemented by an antenna, a tuner, an amplifier, and an AD converter.

Content memory 18 can store data on a content such as a movie and a music number. Movie data includes video pictures and voice and sound. Music number data includes voice and sound. Content memory 18 can be implemented by a hard disk, a CD, or a DVD.

User information memory 16 can store user information.

User setting unit 15 can create user information based on information input from input unit 14 and can have the user information stored in user information memory 16. User setting unit 15 can set a higher priority as an age is younger.

Figures 6, 7, 8:
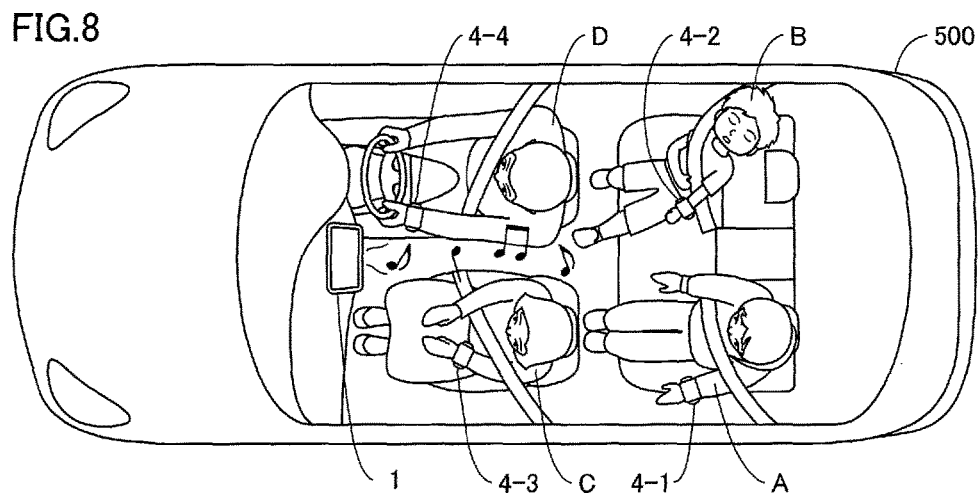
FIG. 6 is a diagram showing exemplary user information.
FIG. 7 is a diagram showing exemplary state information.
FIG. 8 is a diagram showing first exemplary usage of the content reproduction system.

FIG. 6 is a diagram showing exemplary user information.

The user information includes an ID of a wearable terminal used by a user, a user name, an age of the user, an ID of a content preferred by the user, and a priority.

The user enters through input unit 14, an ID of a wearable terminal to be used, a user name, an age of the user, and an ID of a content preferred by the user, for each user. User setting unit 15 can create user information based on the entered information and have the user information stored in user information memory 16. For example, for user A, information indicating that the user is ten years old, a user's preferred content is identified as an ID X, a wearable terminal the user uses is identified as an ID 1, and the priority is a second place is stored.

BT communication instrument 11 can communicate with any of wearable terminals 4-1 to 4-4 under the Bluetooth® communication scheme. BT communication instrument 11 can switch a wearable terminal with which it communicates at certain time intervals. BT communication instrument 11 can receive information S1 with certain period T2 from a wearable terminal which is turned on and is located within a coverage area. BT communication instrument 11 can receive information S2 with certain period T1 from a wearable terminal which is turned on and located within a coverage area and for which determination as to sleeping or awake has been made.

Terminal state manager 12 can manage a state of the wearable terminal based on information S1 and information S2 received by BT communication instrument 11 and can write the state in state information memory 13.

Terminal state manager 12 can specify a wearable terminal which is turned on and located within a coverage area based on the ID of the wearable terminal included in information S1. Terminal state manager 12 can create state information on such a wearable terminal.

Terminal state manager 12 can specify whether or not a user is wearing a wearable terminal which is turned on and located within a coverage area based on the ID of the wearable terminal included in information S2. Terminal state manager 12 can set a put-on flag of the wearable terminal put on a user to 0 (ON) and set a put-on flag of a wearable terminal not put on a user to 1 (OFF).

Terminal state manager 12 can specify whether a user wearing a wearable terminal which is turned on and located within a coverage area is sleeping or awake based on the ID of the wearable terminal and a state flag included in information S2. Terminal state manager 12 can set a state flag of the wearable terminal put on a user who is awake to 0 (awake) and set the state flag of the wearable terminal put on a user who is sleeping to 1 (sleeping).

State information memory 13 can store state information indicating a state of a terminal specified by terminal state manager 12.

FIG. 7 is a diagram showing exemplary state information.

The state information includes an ID of a wearable terminal used by a user, a put-on flag indicating whether or not the user is wearing a wearable terminal, and a state flag indicating whether the user is sleeping or awake. The put-on flag being set to 0 represents wearing (ON), and the put-on flag being set to 1 represents not wearing (OFF). The state flag being set to 0 represents awake and the state flag being set to 1 represents sleeping.

In the example in FIG. 7, all of the wearable terminals with the IDs of 1, 2, 3, and 4 have the put-on flag set to 0 (ON). The wearable terminal with the ID of 2 has the state flag set to 1 (sleeping) and the wearable terminals with the IDs of 1, 3, and 4 have the state flag set to 0 (awake).

Selector 24 can select a user highest in priority as a target user from among users who are awake by referring to the state information and the user information.

Reproduction unit 20 can specify a content preferred by the target user by referring to the user information and reproduce the specified content.

When a content preferred by the target user is music a recorded in content memory 18, reproduction unit 20 can read audio data of music a from content memory 18, reproduce the audio data, and output voice and sound to speaker 22.

When a content preferred by the target user is a movie β recorded in content memory 18, reproduction unit 20 can read video data and audio data of movie β from content memory 18, reproduce the video data and the audio data, output voice and sound to speaker 22, and output video pictures to display 21.

When a content preferred by the target user is a program γ of a TV broadcast, reproduction unit 20 can have broadcast receiver 17 receive broadcast data (video pictures and voice and sound) of program γ on condition that the current time is within broadcast hours of program γ, reproduce the received broadcast data, output voice and sound to speaker 22, and output video pictures to display 21.

When a content preferred by the target user is a program θ of a radio broadcast, reproduction unit 20 can have broadcast receiver 17 receive broadcast data (voice and sound) of program θ on condition that the current time is within broadcast hours of program θ, reproduce the broadcast data, and output voice and sound to speaker 22.

When a content to be reproduced is changed, notification unit 23 can have display 21 show switching to which content preferred by a user has been made. Notification unit 23 can show a status icon indicating a state of each user.

When reproduction is suspended during reproduction of a content and switched to a content preferred by another user, reproduction history memory 19 can store a point of suspension.

FIG. 8 is a diagram showing first exemplary usage of the content reproduction system.

As shown in FIG. 8, a vehicle 500 includes car navigation apparatus 1. Users A, B, C, and D are on board the vehicle and wear wearable terminals 4-1, 4-2, 4-3, and 4-4, respectively. User B among users A, B, C, and D is sleeping and users A, C, and D are awake. A content (a music number) for youngest user A is reproduced on car navigation apparatus 1.

Figure 9:
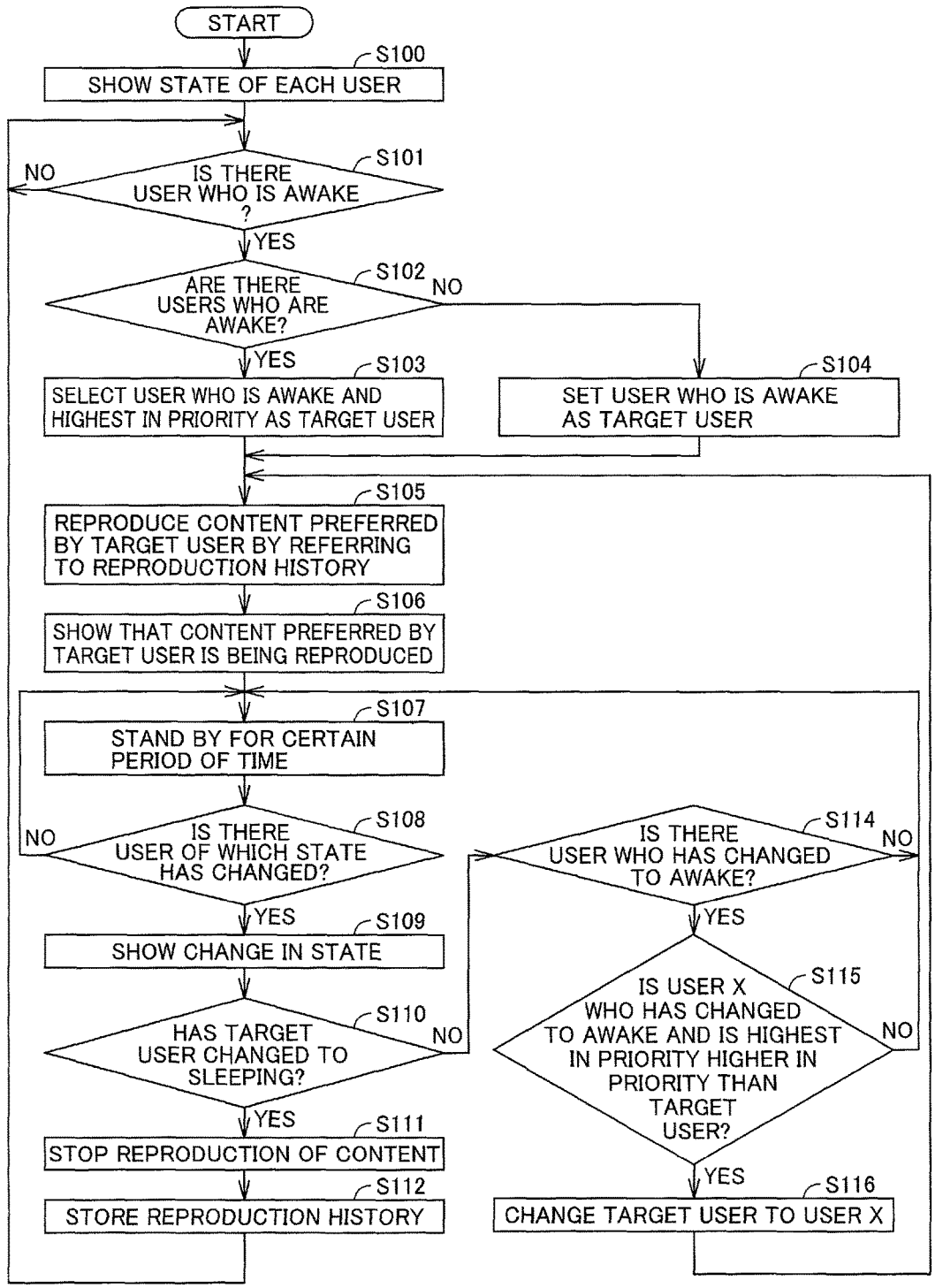
FIG. 9 is an exemplary flowchart showing a control procedure for reproducing a content in the content reproduction system in a first embodiment.

FIG. 9 is an exemplary flowchart showing a control procedure for reproducing a content in the content reproduction system in a first embodiment. In a procedure below, a content to be reproduced is a movie or a music number stored in content memory 18.

In step S100, notification unit 23 can have display 21 show a status icon in accordance with a state of each user who wears the wearable terminal which is turned on and located within a coverage area by referring to the state information in state information memory 13 and the user information in user information memory 16.

Figure 10:
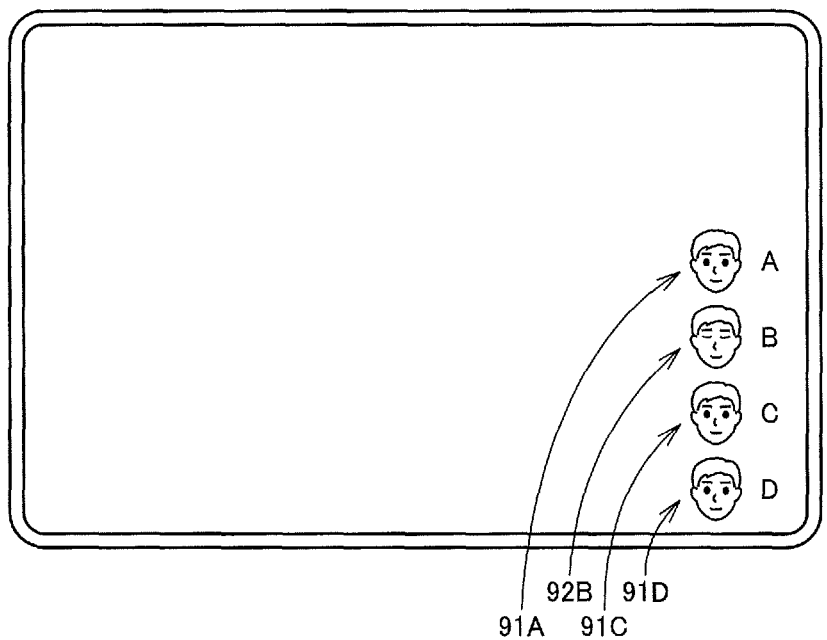
FIG. 10 is a diagram showing an example of a shown status icon.

FIG. 10 is a diagram showing an example of a shown status icon.

As shown in FIG. 7, when the put-on flags of the wearable terminals with the IDs of 1 to 4 are set to 0 (ON), notification unit 23 can specify that users A, B, C, and D are wearing wearable terminals which are turned on and located within a coverage area. When the state flags of the wearable terminals with the IDs of 1, 3, and 4 are set to 0 (awake) and the state flag of the wearable terminal with the ID of 2 is set to 1 (sleeping) as in FIG. 7, notification unit 23 can show status icons 91A, 91C, and 91D indicating that users A, C, and D are awake and a status icon 92B indicating that user B is sleeping as shown in FIG. 10.

In step S101, selector 24 can check whether or not there is a user who is awake by referring to the state information in state information memory 13. When there is a user who is awake, the process proceeds to step S102.

When there are a plurality of users who are awake in step S102, the process proceeds to step S103, and when there is one user who is awake, the process proceeds to step S104.

In step S103, selector 24 can select a user highest in priority as a target user from among the plurality of users who are awake by referring to the user information in user information memory 16.

In step S104, selector 24 can select one user who is awake as the target user.

In step S105, reproduction unit 20 can specify a content preferred by the target user by referring to the user information in user information memory 16 and reproduce the specified content. When a history of reproduction in reproduction history memory 19 is referred to and the history indicates that the specified content was suspended during reproduction, reproduction unit 20 can reproduce the content from a point of suspension.

Notification unit 23 can have display 21 show a message indicating that the content preferred by the target user is being reproduced.

Figure 11:
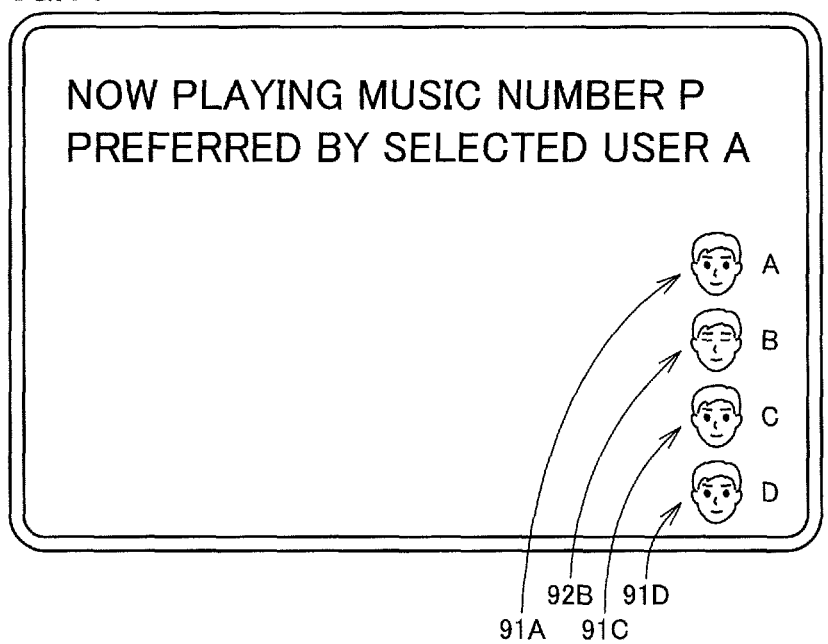
FIG. 11 is a diagram showing an example of a given message.

FIG. 11 is a diagram showing an example of a given message.

When user A is highest in priority among users A, C, and D who are awake, user A is selected as the target user. When a content X preferred by user A is a music number P, notification unit 23 can show a message that music number P preferred by user A is being reproduced as shown in FIG. 11.

In step S107, stand-by processing is performed for a certain period of time.

In step S108, notification unit 23 can check whether or not there is a user of which state has changed by referring to the state information in state information memory 13. When there is a user of which state has changed, the process proceeds to step S109, and when there is no user of which state has changed, the process returns to step S107.

In step S109, notification unit 23 can change the status icon of the user of which state has changed and show a message indicating such change in state.

Figure 12:
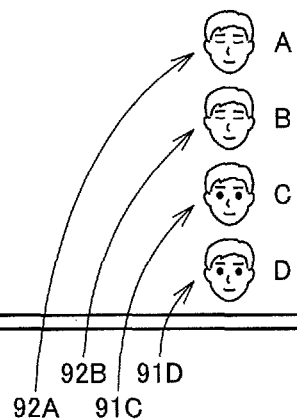
FIG. 12 is a diagram showing an example of shown status icon and message.

FIG. 12 is a diagram showing an example of shown status icon and message.

When user A has changed to sleeping as shown in FIG. 12, notification unit 23 can show a status icon 92A indicating that user A is sleeping instead of status icon 91A indicating that user A is awake. Notification unit 23 can further show a message indicating that target user A has changed to sleeping.

Figure 13:
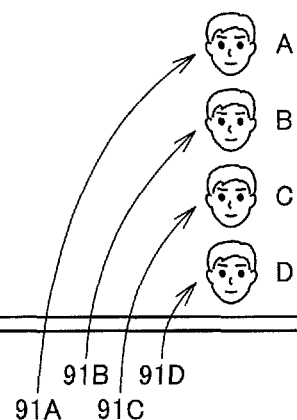
FIG. 13 is a diagram showing another example of shown status icon and message.

FIG. 13 is a diagram showing another example of shown status icon and message.

When user B has changed to awake as shown in FIG. 13, notification unit 23 can show a status icon 91B indicating that user B is awake instead of status icon 92B indicating that user B is sleeping. Notification unit 23 can further show a message indicating that user B has changed to awake.

When the target user has changed to sleeping in step S110, the process proceeds to step S111, and when the target user has not changed to sleeping, the process proceeds to step S114.

In step S111, reproduction unit 20 can stop reproduction of the content.

In step S112, information indicating a point of suspension in a content (a frame number of video pictures and voice and sound) can be stored in reproduction history memory 19.

After step S112, the process returns to step S101.

When there is a user who has changed from sleeping to awake in step S114, the process proceeds to step S115, and when there is no such user, the process returns to step S107.

When a user highest in priority (hereinafter a user X) among one or more users who have changed from sleeping to awake is higher in priority than the target user in step S115, the process proceeds to step S116, and when the user is lower in priority than the target user, the process returns to step S107.

In step S116, selector 24 can change the target user to user X.

After step S116, the process returns to step S105.

As set forth above, according to the first embodiment, a content preferred by a user who is awake and youngest among a plurality of users can be reproduced. A content which complies with intentions of all of the plurality of users can thus automatically be selected without a manual operation.

Modification of First Embodiment

Though the content reproduction system placed in a vehicle is described in the first embodiment, limitation thereto is not intended. For example, the content reproduction system may be placed in a living room where family members gather. In that case, a television receiver is placed instead of the car navigation apparatus.

Figure 14:
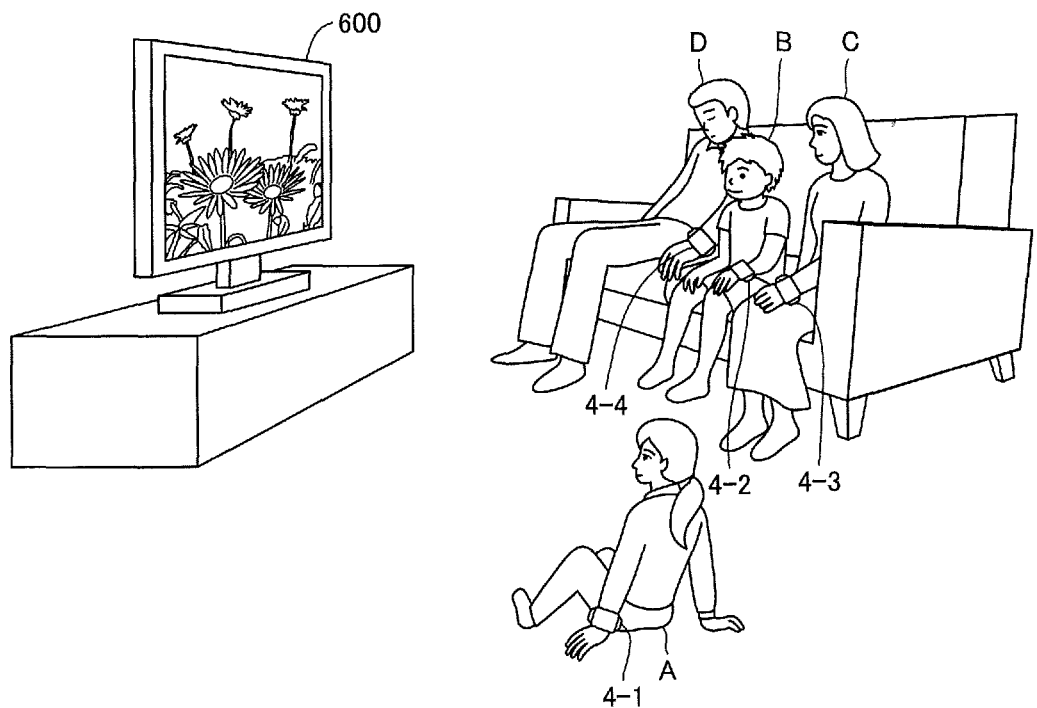
FIG. 14 is a diagram showing second exemplary usage of the content reproduction system.

FIG. 14 is a diagram showing second exemplary usage of the content reproduction system.

The content reproduction system includes a television receiver 600 instead of car navigation apparatus 1. Television receiver 600 includes the components included in car navigation apparatus 1 in FIG. 5.

Television receiver 600 is placed in a living room as shown in FIG. 14. Users A, B, C, and D in the living room wear wearable terminals 4-1, 4-2, 4-3, and 4-4, respectively. Among users A, B, C, and D, user D is sleeping and users A, B and C are awake. In this case, a content (a music number) for user B who is awake and youngest is reproduced on television receiver 600.

When a content preferred by users A to D is a music number, the content reproduction system may include audio equipment including the components included in car navigation apparatus 1 in FIG. 5 instead of television receiver 600.

Second Embodiment

Though wearable terminal 4 includes sleep determination unit 32 in the first embodiment, car navigation apparatus 1 includes a sleep determination unit 61 in a second embodiment.

Figure 15:
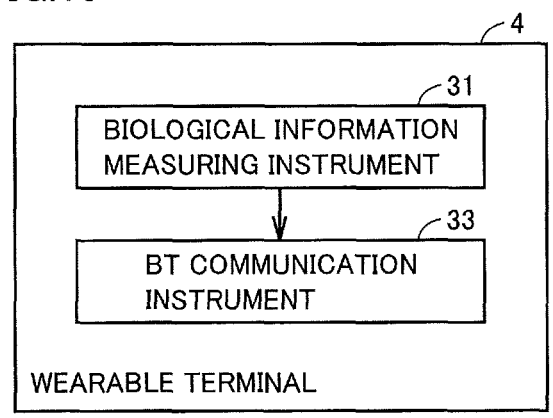
FIG. 15 is a diagram showing a configuration of the wearable terminal in a second embodiment.

FIG. 15 is a diagram showing a configuration of wearable terminal 4 in the second embodiment.

Wearable terminal 4 includes biological information measuring instrument 31 and BT communication instrument 33.

Biological information measuring instrument 31 is the same as in the first embodiment.

BT communication instrument 33 can communicate with car navigation apparatus 1 under the Bluetooth® communication scheme when wearable terminal 4 is turned on and is located within a coverage area of communication with car navigation apparatus 1.

BT communication instrument 33 can transmit information including an ID of a wearable terminal (hereinafter information S1) as shown in FIG. 3 with certain period T2, where relation of T2<T1 is satisfied.

Figure 16:
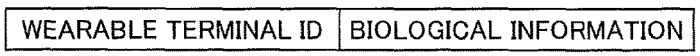
FIG. 16 is a diagram showing information S3.

When one piece of biological information is measured, BT communication instrument 33 can transmit with certain period T1, information including an ID of the wearable terminal and biological information (hereinafter information S3) as shown in FIG. 16. When the user is not wearing wearable terminal 4, information S3 is not transmitted.

Figure 17:
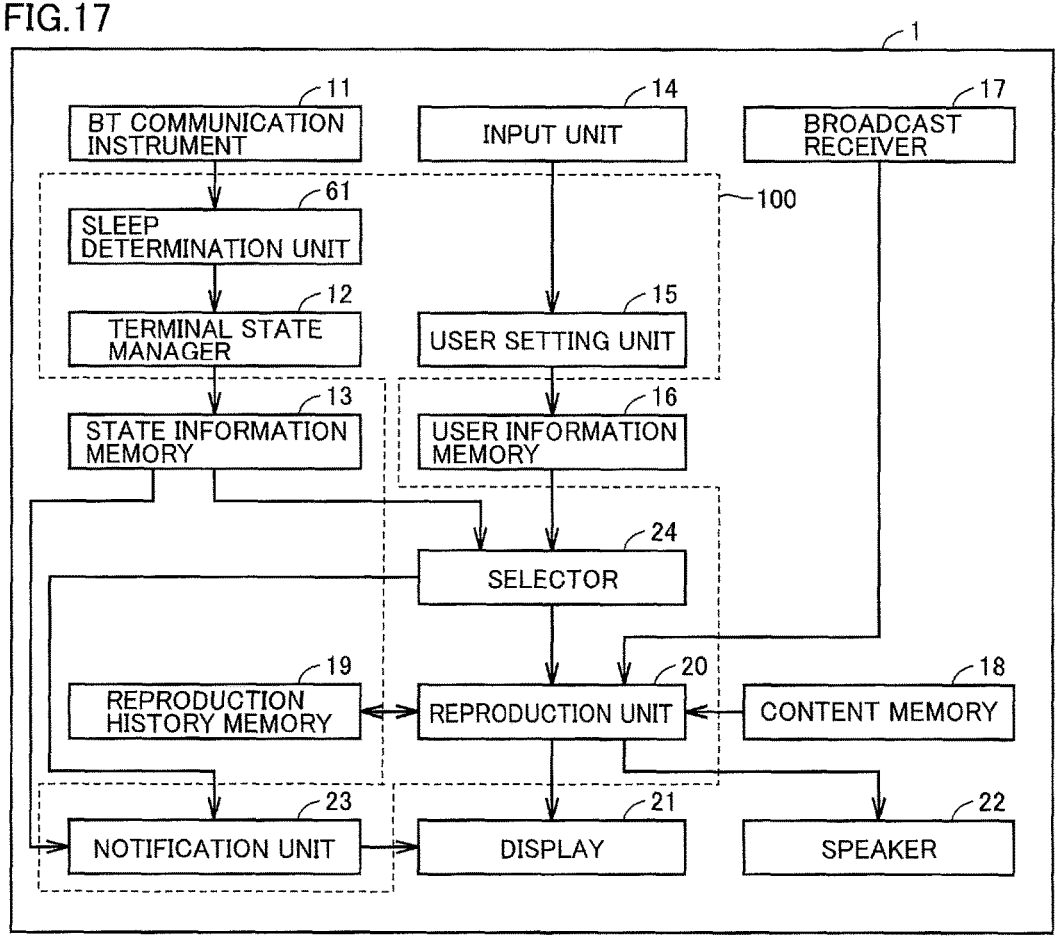
FIG. 17 is a diagram showing a configuration of the car navigation apparatus in the second embodiment.

FIG. 17 is a diagram showing a configuration of car navigation apparatus 1 in the second embodiment.

Car navigation apparatus 1 in the second embodiment is different from car navigation apparatus 1 in the first embodiment in the following.

BT communication instrument 11 can receive information S1 with certain period T2 from a wearable terminal which is turned on and located within a coverage area.

BT communication instrument 11 can further receive information S3 with certain period T1 from the wearable terminal which is turned on and located within a coverage area and has measured biological information.

Car navigation apparatus 1 in the second embodiment includes sleep determination unit 61.

When information S3 is received, sleep determination unit 61 can determine a state of a user based on the biological information included in information S3. For example, sleep determination unit 61 can determine whether a user is sleeping or awake based on a pulse of the user.

Even though the sleep determination unit is provided not on a side of the wearable terminal but on a side of car navigation as above, a content preferred by a user who is awake and youngest among a plurality of users can be reproduced as in the first embodiment.

In the second embodiment as well, the content reproduction system may include television receiver 600 including the components the same as in car navigation apparatus 1 described above instead of car navigation apparatus 1 described above.

Third Embodiment

Figure 18:
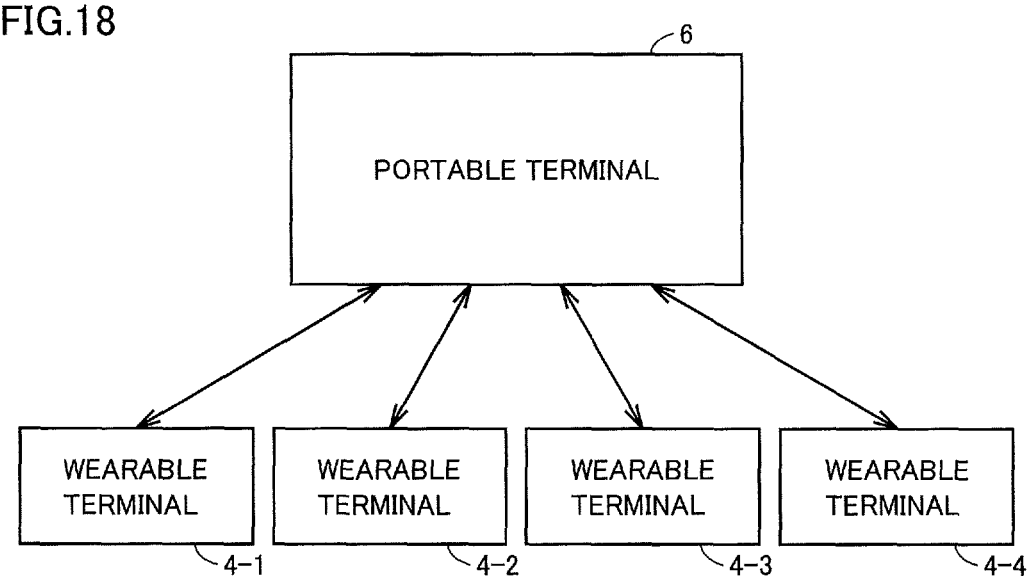
FIG. 18 is a diagram showing a configuration of the content reproduction system in a third embodiment.

FIG. 18 is a diagram showing a configuration of the content reproduction system in a third embodiment.

This content reproduction system includes a portable terminal 6 and wearable terminals 4-1 to 4-4. Portable terminal 6 performs a function such as normal communication and conversation and the content reproduction function as in the first embodiment. Therefore, portable terminal 6 includes each component shown in FIG. 3. The same function can thus be performed also by using portable terminal 6 instead of car navigation apparatus 1 or television receiver 600.

In portable terminal 6, content memory 18 can be implemented by an SD card or an internal memory.

Even when the content reproduction apparatus is implemented by a portable terminal instead of the car navigation apparatus as above, a content preferred by a user who is awake and youngest among a plurality of users can be reproduced as in the first embodiment.

Fourth Embodiment

Figure 19:
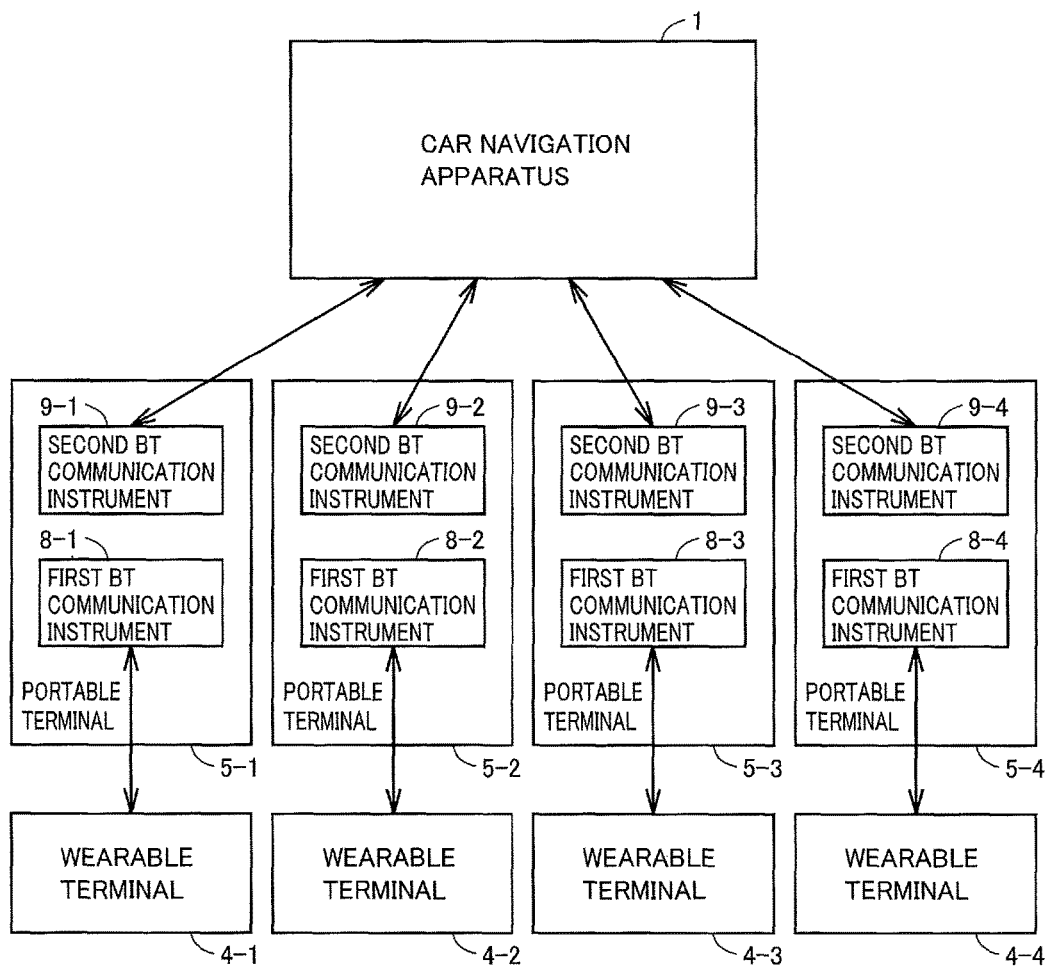
FIG. 19 is a diagram showing a configuration of the content reproduction system in a fourth embodiment.

FIG. 19 is a diagram showing a configuration of the content reproduction system in a fourth embodiment.

The content reproduction system includes car navigation apparatus 1, portable terminals 5-1 to 5-4, and wearable terminals 4-1 to 4-4.

Portable terminals 5-1 to 5-4 can relay communication between wearable terminals 4-1 to 4-4 and car navigation apparatus 1.

Though car navigation apparatus 1 is configured as in the first embodiment, a destination of connection for communication is set to portable terminals 5-1 to 5-4 instead of wearable terminals 4-1 to 4-4.

Though wearable terminals 4-1 to 4-4 are configured as in the first embodiment, a destination of connection for communication is set to portable terminals 5-1 to 5-4 instead of car navigation apparatus 1.

A portable terminal 5-$i$ ($i$=1 to 4) includes a first BT communication instrument 8-$i$ for communication with wearable terminal 4-$i$ and a second BT communication instrument 9-$i$ for communication with car navigation apparatus 1.

BT communication instrument 8-$i$ can receive information S1 and information S2 from wearable terminal 4-$i$. BT communication instrument 9-$i$ can transmit received information S1 and information S2 to car navigation apparatus 1.

Even when the wearable terminal and the car navigation apparatus are not able to directly communicate with each other as above, a content preferred by a user who is awake and youngest among a plurality of users can be reproduced as in the first embodiment.

In the fourth embodiment as well, the content reproduction system may include television receiver 600 including the components the same as in car navigation apparatus 1 described above instead of car navigation apparatus 1 described above.

Fifth Embodiment

Figure 20:
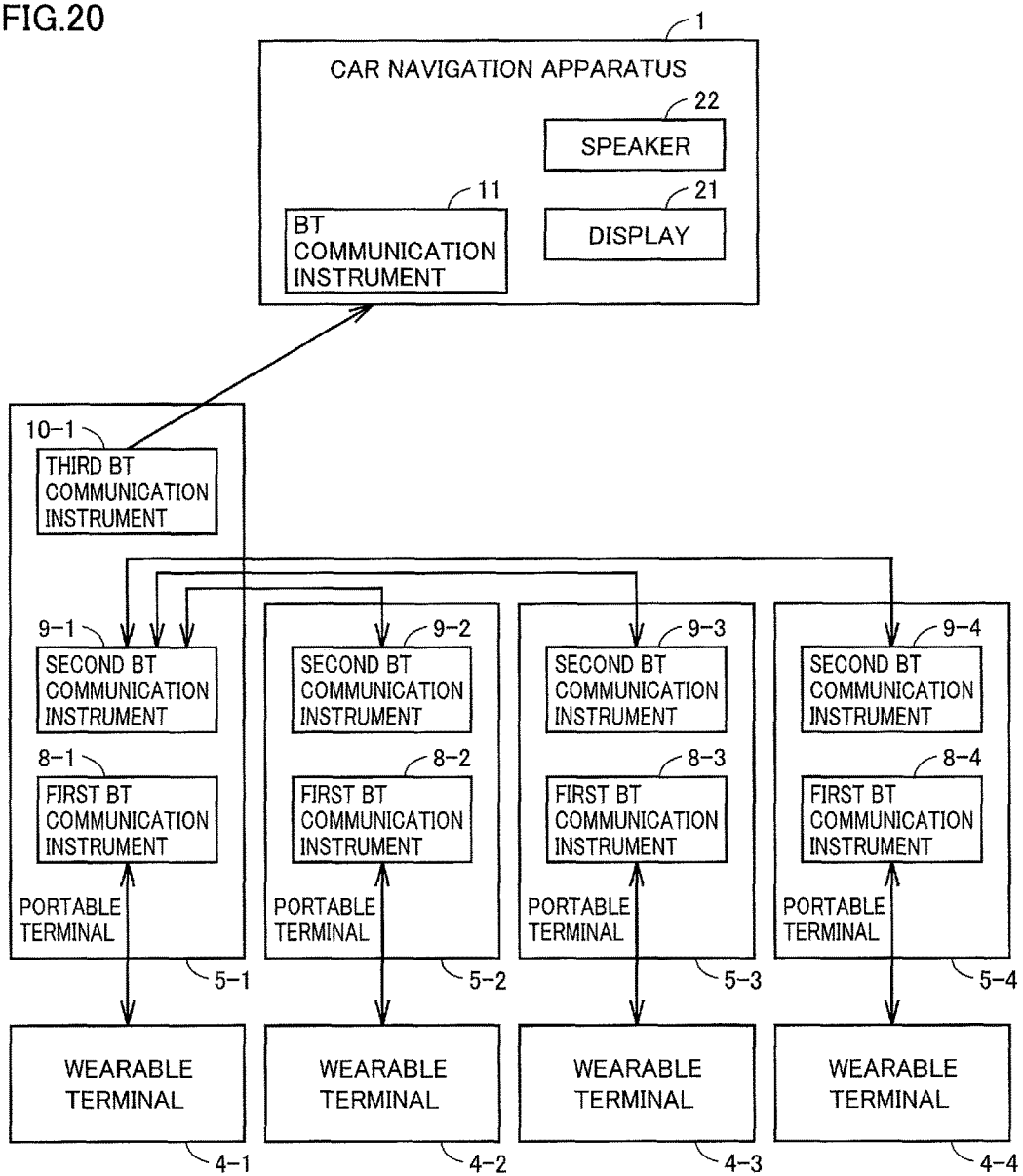
FIG. 20 is a diagram showing a configuration of the content reproduction system in a fifth embodiment.

FIG. 20 is a diagram showing a configuration of the content reproduction system in a fifth embodiment.

The content reproduction system includes car navigation apparatus 1, portable terminals 5-1 to 5-4, and wearable terminals 4-1 to 4-4.

Portable terminal 5-1 performs a function such as normal communication and conversation and the content reproduction function as in the first embodiment. Therefore, portable terminal 5-1 includes each component shown in FIG. 3. The same function can be performed also by using portable terminal 5-1 instead of car navigation apparatus 1.

Though wearable terminals 4-1 to 4-4 are configured as in the first embodiment, a destination of connection for communication is set to portable terminals 5-1 to 5-4 instead of car navigation apparatus 1.

Portable terminal 5-$i$ ($i$=2, 3, and 4) includes first BT communication instrument 8-$i$ for communication with wearable terminal 4-$i$ and second BT communication instrument 9-$i$ for communication with portable terminal 5-1. BT communication instrument 8-$i$ can receive information S1 and information S2 from wearable terminal 4-$i$. BT communication instrument 9-$i$ can transmit received information S1 and information S2 to portable terminal 5-1.

Portable terminal 5-1 includes a first BT communication instrument 8-1 for communication with wearable terminal 4-1, a second BT communication instrument 9-1 for communication with portable terminals 5-2 to 5-4, and a third BT communication instrument 10-1 for communication with car navigation apparatus 1.

Figure 21:
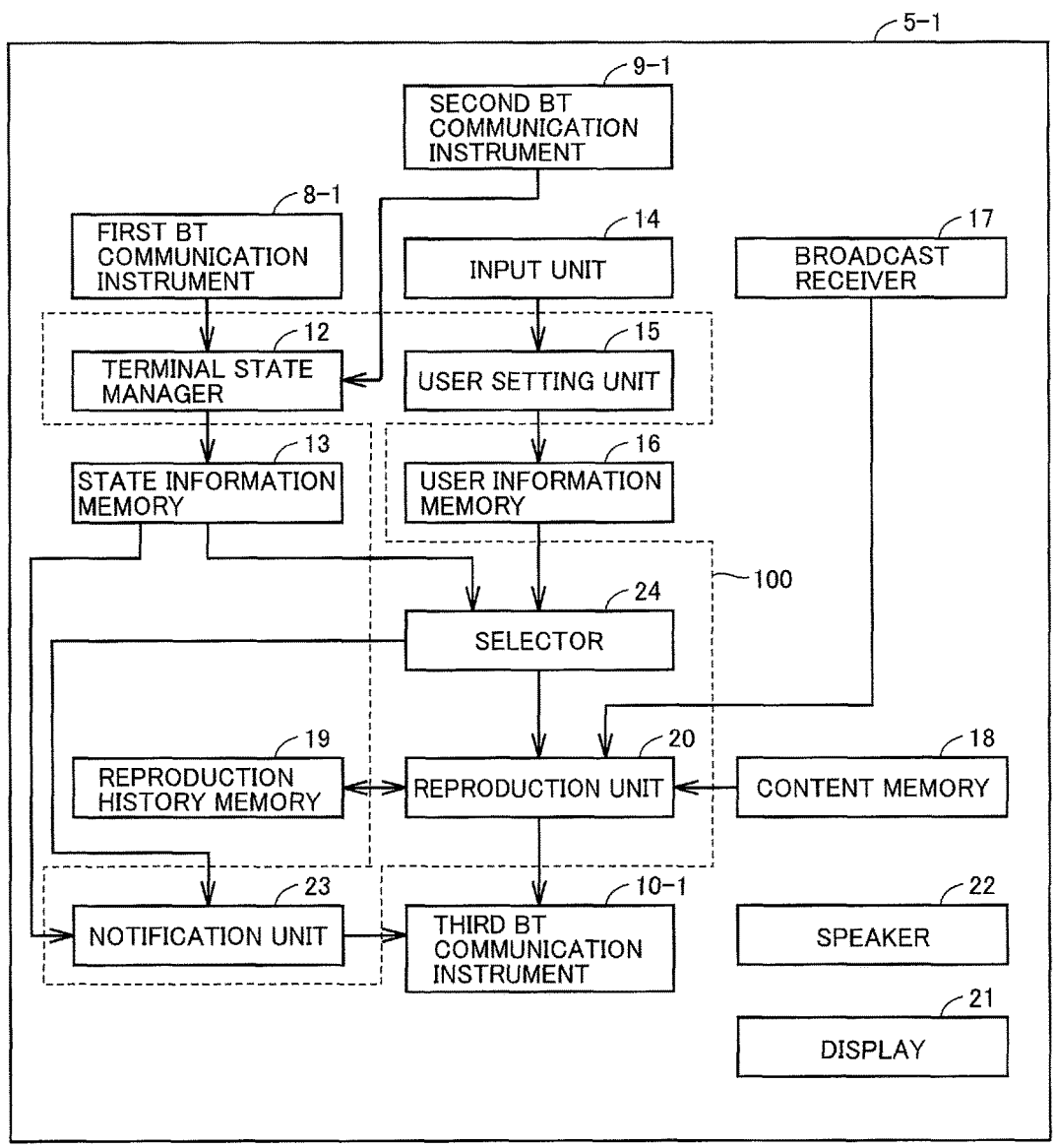
FIG. 21 is a diagram showing a configuration of a portable terminal.

FIG. 21 is a diagram showing a configuration of portable terminal 5-1.

Though this portable terminal 5-1 includes components basically the same as the components of car navigation apparatus 1 in the first embodiment shown in FIG. 3, it is different from car navigation apparatus 1 in the first embodiment in the following.

First BT communication instrument 8-1 can receive information S1 and information S2 from wearable terminal 4-1. Second BT communication instrument 9-1 can receive information S1 and information S2 from portable terminals 5-2 to 5-4.

Reproduction unit 20 can output video pictures obtained by reproducing a content to third BT communication instrument 10-1. Reproduction unit 20 can output voice and sound obtained by reproducing the content to third BT communication instrument 10-1.

Notification unit 23 can output characters representing a message and an image representing a mark to third BT communication instrument 10-1.

Third BT communication instrument 10-1 can transmit information S4 including video pictures, images, and characters to car navigation apparatus 1.

Unlike the first embodiment, car navigation apparatus 1 in the fifth embodiment performs a normal car navigation function, whereas it does not perform the content reproduction function. Car navigation apparatus 1 includes display 21, speaker 22, and BT communication instrument 11.

BT communication instrument 11 of car navigation apparatus 1 can receive information S4, output video pictures, images, and characters included in information S4, and output voice and sound included in information S4 to speaker 22.

Even though the car navigation apparatus does not perform the content reproduction function as above, the portable terminal performs the content reproduction function so that a content preferred by a user who is awake and youngest among a plurality of users can be reproduced as in the first embodiment.

In the fifth embodiment as well, the content reproduction system may include television receiver 600 including the components the same as in car navigation apparatus 1 described above instead of car navigation apparatus 1 described above.

Sixth Embodiment

The content reproduction system in a sixth embodiment performs a function to give a notification about whether or not a user is wearing a wearable terminal.

In embodiments described above, notification unit 23 shows a status icon indicating that each user is awake or a status icon indicating that each user is sleeping based on the state flag included in the state information.

In the sixth embodiment, notification unit 23 can further show a status icon indicating that each user is wearing a wearable terminal or a status icon indicating that each user is not wearing a wearable terminal based on a put-on flag included in the state information.

Figure 22:
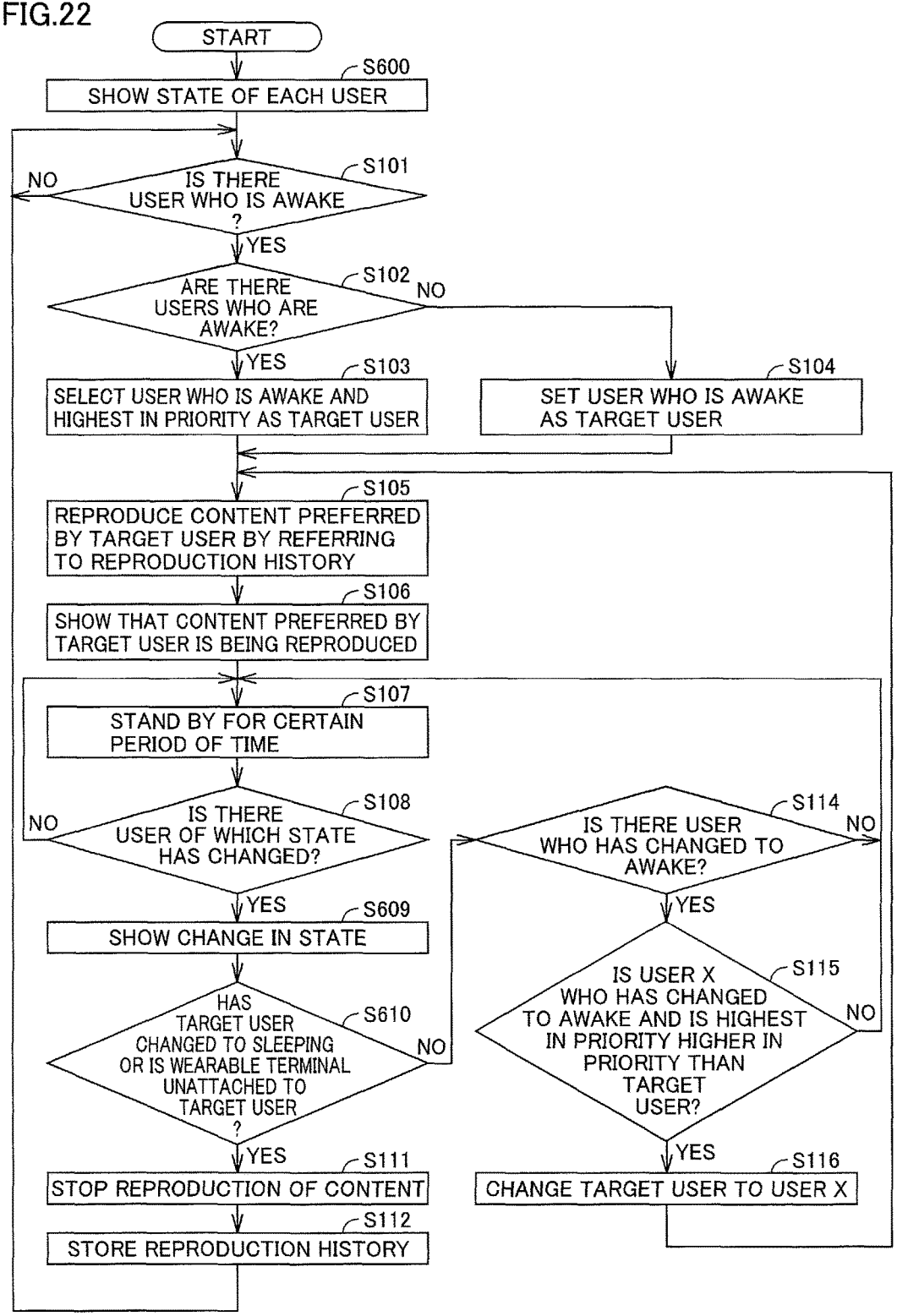
FIG. 22 is an exemplary flowchart showing a control procedure for reproducing a content in the content reproduction system in a sixth embodiment.

FIG. 22 is an exemplary flowchart showing a control procedure for reproducing a content in the content reproduction system in the sixth embodiment.

The flowchart in FIG. 22 is different from the flowchart in FIG. 8 in including steps S600, S609, and S610 instead of steps S100, S109, and S110.

In step S600, notification unit 23 can have display 21 show a status icon in accordance with a state of each user who wears a wearable terminal which is turned on and located within a coverage area by referring to the state information in state information memory 13 and the user information in user information memory 16.

Figure 23:
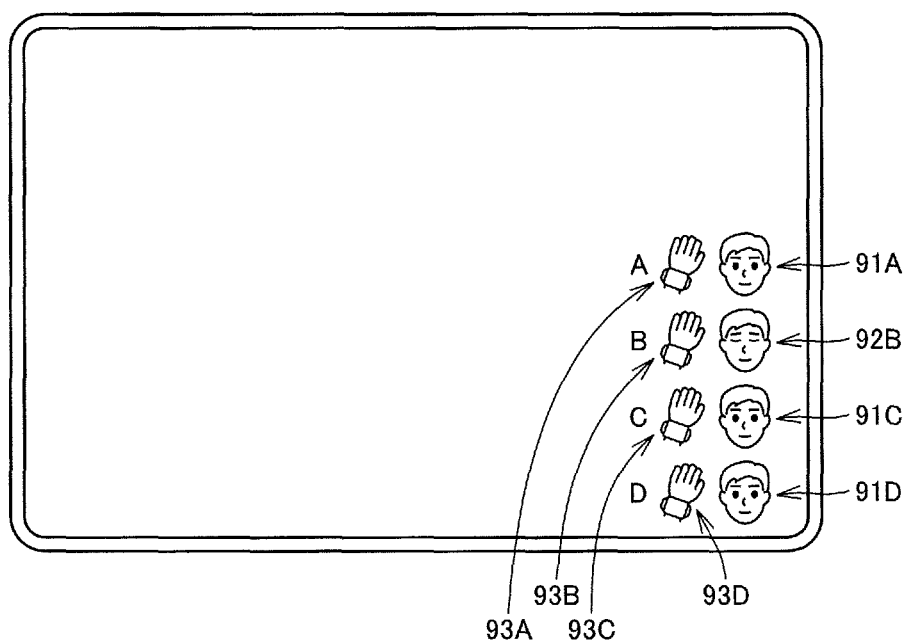
FIG. 23 is a diagram showing an exemplary status icon shown when the state information in FIG. 7 is recorded.

FIG. 23 is a diagram showing an exemplary status icon shown when the state information in FIG. 7 is recorded.

When the put-on flags of the wearable terminals with the IDs of 1 to 4 are set to 0 (ON) as shown in FIG. 7, notification unit 23 can show status icons 93A, 93B, 93C, and 93D indicating that users A, B, C, and D are wearing the respective wearable terminals.

When the state flags of the wearable terminals with the IDs of 1, 3, and 4 are set to 0 (awake) and the state flag of the wearable terminal with the ID of 2 is set to 1 (sleeping) as in FIG. 7, notification unit 23 can show status icons 91A, 91C, and 91D indicating that users A, C, and D are awake and status icon 92B indicating that user B is sleeping as in the first embodiment.

In step S609, notification unit 23 can change a status icon of a user of which state has changed and show a message indicating such change in state.

Figures 24, 25:
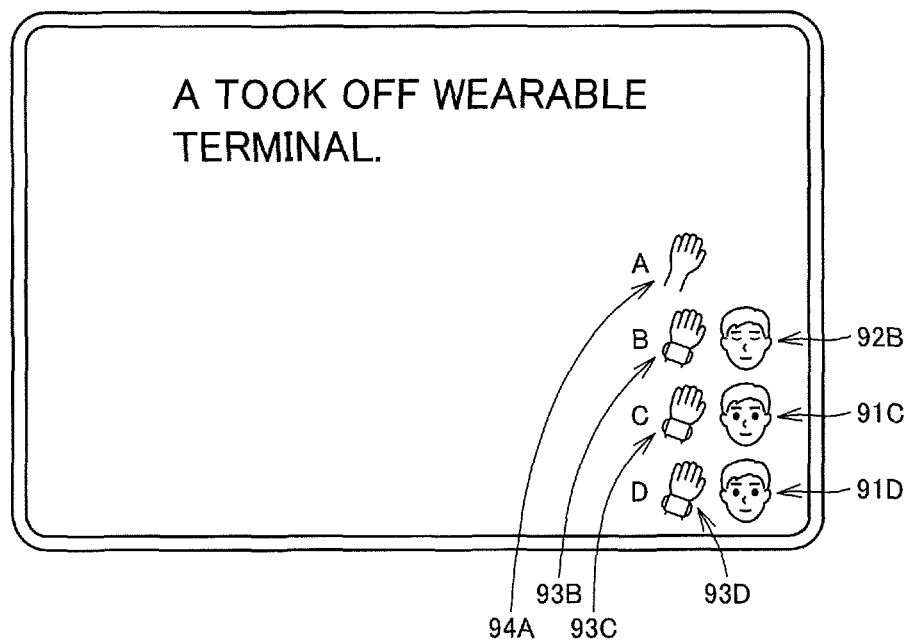
FIG. 24 is a diagram showing an example of changed state information.
FIG. 25 is a diagram showing exemplary status icon and message shown when the state information in FIG. 24 is recorded.

FIG. 24 is a diagram showing an example of changed state information.

In FIG. 24, the put-on flag of the wearable terminal with the ID of 1 has been changed to 1 (OFF) and the state flag has changed to an undefined value.

FIG. 25 is a diagram showing exemplary status icon and message shown when the state information in FIG. 24 is recorded.

When the put-on flag of the wearable terminal with the ID of 1 has changed to 1 (OFF), notification unit 23 can show a status icon 94A indicating that user A is not wearing the wearable terminal as shown in FIG. 25. Notification unit 23 can further show a message that user A has taken off the wearable terminal.

In step S610, the process proceeds to step S111 not only when the target user has changed to sleeping but also when the target user has changed to not wearing the wearable terminal.

As set forth above, according to the sixth embodiment, when user A (for example, a child in a rear seat of the vehicle) has taken off the wearable terminal, that fact is shown on the car navigation apparatus and hence user C (for example, a parent in a front seat) can notice the change in state of user A. For example, when the child feels a physically bad condition and takes off the wearable terminal, a parent can quickly be notified of such change in condition.

In the sixth embodiment as well, the content reproduction system may include television receiver 600 including the components the same as in car navigation apparatus 1 described above instead of car navigation apparatus 1 described above.

Seventh Embodiment

The content reproduction system in a seventh embodiment performs a function to give a notification as to whether or not a wearable terminal can establish connection for communication.

In the seventh embodiment, terminal state manager 12 can specify a wearable terminal which is turned on and located within a coverage area (a wearable terminal which can communicate) based on an ID of the wearable terminal included in information S1. Terminal state manager 12 can erase from state information memory 13, state information on a wearable terminal which has not been specified as a wearable terminal which can communicate, of the state information in state information memory 13.

Figure 26:
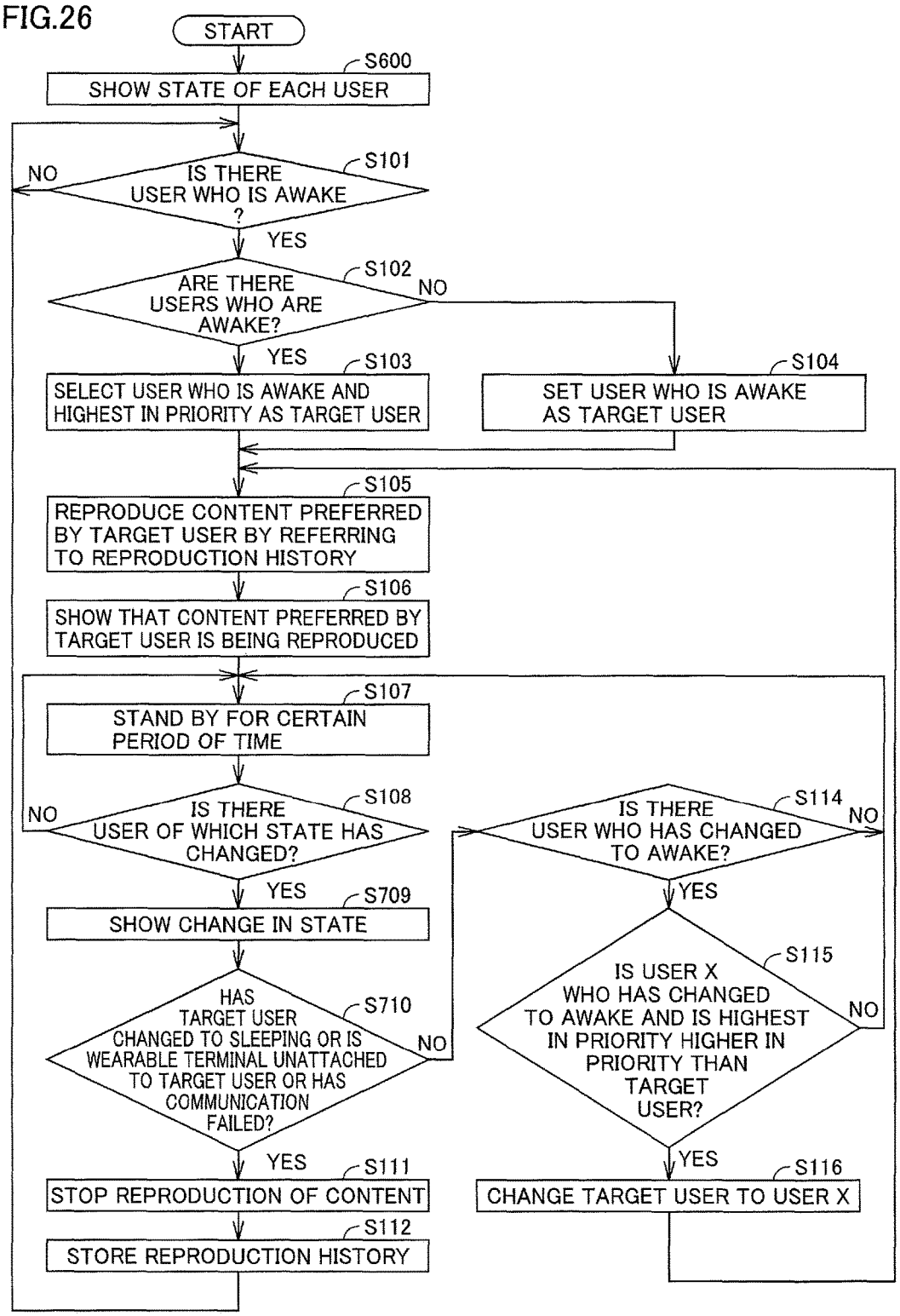
FIG. 26 is an exemplary flowchart showing a control procedure for reproducing a content in the content reproduction system in a seventh embodiment.

FIG. 26 is an exemplary flowchart showing a control procedure for reproducing a content in the content reproduction system in the seventh embodiment.

The flowchart in FIG. 26 is different from the flowchart in FIG. 22 in including steps S709 and S710 instead of steps S609 and S610.

In step S709, notification unit 23 can change a status icon of a user of which state has changed and show a message indicating such change in state.

Figures 27, 28:
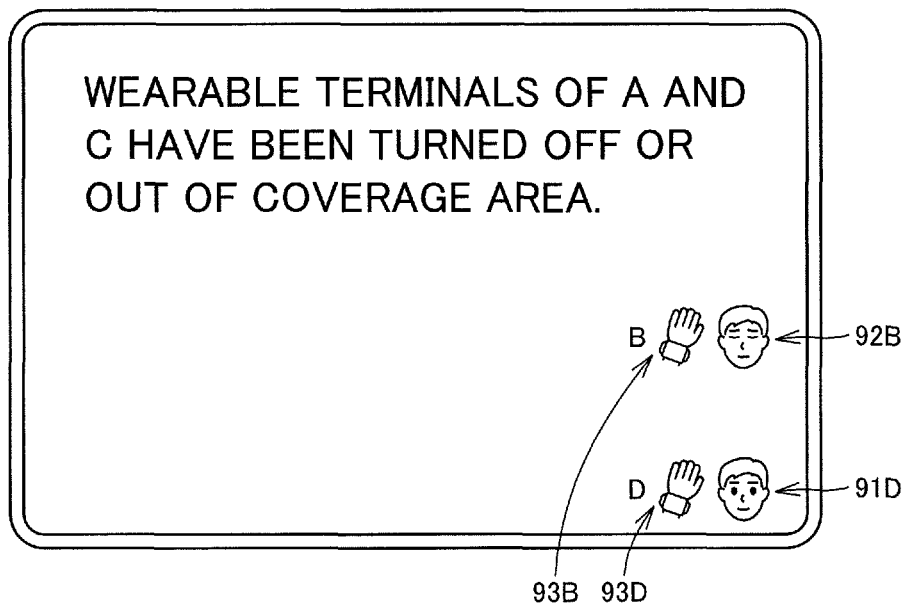
FIG. 27 is a diagram showing an example of changed state information.
FIG. 28 is a diagram showing exemplary status icon and message shown when the state information in FIG. 27 is recorded.

FIG. 27 is a diagram showing an example of changed state information.

In FIG. 27, state information of the wearable terminals with the IDs of 1 and 3 has been erased.

FIG. 28 is a diagram showing exemplary status icon and message shown when the state information in FIG. 27 is recorded.

When state information of the wearable terminals with the IDs of 1 and 3 has been erased, notification unit 23 can turn off status icons 93A and 91A of user A and status icons 93C and 91C of user C. Notification unit 23 can further show a message indicating that the wearable terminals of user A and user C are turned off or out of a coverage area.

In step S710, the process proceeds to step S111 not only when the target user has changed to sleeping or to not wearing the wearable terminal but also when the wearable terminal has failed in communication.

As set forth above, according to the seventh embodiment, a notification about a user of which wearable terminal has failed in communication is given. Therefore, for example, when a bus makes a stop at a service area, a driver can know who has not returned to the bus.

In the seventh embodiment as well, the content reproduction system may include television receiver 600 including the components the same as in car navigation apparatus 1 described above instead of car navigation apparatus 1 described above.

Eighth Embodiment

In embodiments above, data on a content preferred by a user is stored in content memory 18.

In the content reproduction system in an eighth embodiment, data on a content preferred by a user is transmitted in a real-time broadcast service such as a television broadcast or a radio broadcast.

Figure 29:
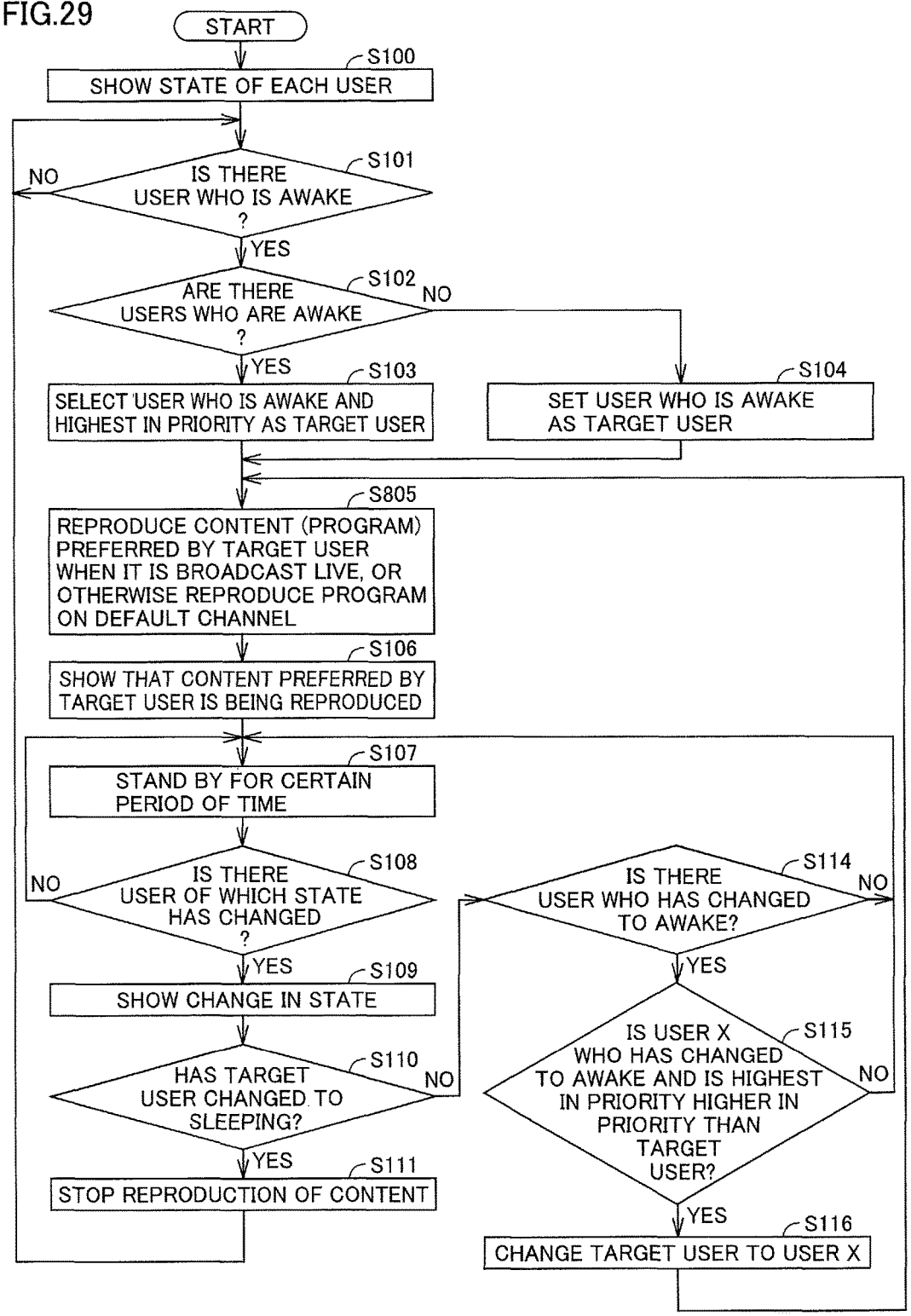
FIG. 29 is an exemplary flowchart showing a control procedure for reproducing a content in the content reproduction system in an eighth embodiment.

FIG. 29 is an exemplary flowchart showing a control procedure for reproducing a content in the content reproduction system in the eighth embodiment.

The flowchart in FIG. 29 is different from the flowchart in FIG. 9 in including step S805 instead of step S105 and not including step S112.

In step S805, reproduction unit 20 can specify a content (program) preferred by a target user by referring to the user information in user information memory 16, and when the specified program is being broadcast, reproduction unit 20 can receive and reproduce broadcast data of that program. When the specified program is not being broadcast, reproduction unit 20 can receive and reproduce broadcast data of a program on a default channel.

When the specified program is not being broadcast, the selector may make a change to set a user second highest in priority as the target user, and when a program preferred by that user is being broadcast, reproduction unit 20 may receive and reproduce broadcast data of that program.

When the target user has changed to sleeping and reproduction is stopped and the user wakes up and is again selected as the target user and when a previously selected program is still being broadcast, selector 24 can select that program again, and when the previously selected program is not being broadcast, selector 24 may select a program on the same channel or a program on a default channel.

In the eighth embodiment as well, the content reproduction system may include television receiver 600 including the components the same as in car navigation apparatus 1 described above instead of car navigation apparatus 1 described above.

Modification of Eighth Embodiment

User information memory 16 may store an ID of a genre preferred by a user instead of an ID of a content (program) preferred by a user.

FIG. 30 is a diagram showing exemplary user information.

The user information includes an ID of a wearable terminal to be used by a user, a user name, an age of the user, and a priority as in the first embodiment. The user information includes an ID of a genre preferred by the user instead of an ID of a content preferred by the user.

For example, a genre with the ID of 1 can be set to animation, a genre with the ID of 2 can be set to dramas, a genre with the ID of 3 can be set to news, and a genre with the ID of 4 can be set to live sports.

Instead of step S805 in the flowchart in FIG. 29, in the present modification, reproduction unit 20 can specify a genre preferred by a target user by referring to the user information in user information memory 16. When a program in the genre preferred by the target user is being broadcast, reproduction unit 20 can receive and reproduce broadcast data of that program. When a program in the genre preferred by the target user is not being broadcast, reproduction unit 20 can receive and reproduce broadcast data of a program on a default channel.

When a program in the genre preferred by the target user is not being broadcast, selector 24 may make a change to set a user second highest in priority as the target user, and when a program in the genre preferred by that user is being broadcast, reproduction unit 20 may receive and reproduce broadcast data of that program.

When a plurality of programs in the genre preferred by the target user are being broadcast, reproduction unit 20 can select any program and receive and reproduce broadcast data of that program. Thereafter, when the target user has changed to sleeping and reproduction is stopped and the user wakes up and is again selected as the target user and when a previously selected program is still being broadcast, selector 24 can select that program again, and when the previously selected program is not being broadcast, selector 24 may select another program in the genre preferred by the user.

In the modification of the eighth embodiment as well, the content reproduction system may include television receiver 600 including the components the same as in car navigation apparatus 1 described above instead of car navigation apparatus 1 described above.

Modification (1) Priority

Though a higher priority is set for a younger user in embodiments above, limitation thereto is not intended. A higher priority may be set for an elder user. Alternatively, a user may arbitrarily be able to set a priority. The priority may change over time.

(2) Detection of Sleep

Though whether a user is sleeping or awake is determined based on detection of a biological state of the user with a wearable terminal in embodiments above, limitation thereto is not intended. For example, a face of a user may be shot with a camera and a face image may be subjected to image processing so that whether a user is sleeping or awake can be determined. Furthermore, user information may be created by subjecting a face image to image processing and estimating an approximate age of the user. A content preferred by a user may automatically be set in accordance with the age of the user.

(3) Wearable

A wearable terminal is not limited to a watch type terminal, and it may be, for example, a head-mounted terminal or a glass type terminal.

(4) Notification to Wearable Terminal

When there is a user who has changed to not wearing a wearable terminal or there is a user who has changed to sleeping, the notification unit of the car navigation apparatus may notify a wearable terminal of another user of that fact. For example, when a wearable terminal of a child has changed to not wearing or when a child has changed to sleeping, the notification unit notifies a wearable terminal of a parent of that fact and the parent may be notified of an abnormal condition through representation of a message, output of an alarm, or vibration in his/her wearable terminal.

It should be understood that embodiments disclosed herein are illustrative and non-restrictive in every respect. The scope of the present disclosure is defined by the terms of the claims rather than the description above, and is intended to include any modifications within the scope and meaning equivalent to the terms of the claims.

The invention claimed is:

1. A reproduction apparatus comprising:
   a state memory configured to store states of a plurality of users who are sleeping or awake; and
   at least one processor,
   the at least one processor being configured
      to set priorities among the plurality of users and select one user as a target user from among the plurality of users based on the states of the plurality of users and the priorities among the plurality of users, and
      to reproduce a content in accordance with the target user;
   a communication instrument configured to communicate with a wearable terminal wearable on each of the plurality of users, the communication instrument being configured to receive biological information of each user who wears the wearable terminal, the biological information being transmitted from the wearable terminal, wherein the at least one processor is configured to determine whether the user is wearing the wearable terminal based on whether the biological information has been received; and
   a display, coupled to the at least one processor, wherein the at least one processor is configured to cause the display to show information on whether at least one of the plurality of users is not wearing a respective wearable terminal associated with the at least one of the plurality of users or whether the communication instrument is unable to communicate with a wearable terminal associated with the at least one of the plurality of users.

2. The reproduction apparatus according to claim 1, wherein
   the at least one processor is configured to set the priorities among the plurality of users based on ages of the plurality of users.

3. The reproduction apparatus according to claim 2, wherein
   the at least one processor is configured
      to set a higher priority as a user is younger, and
      to select a user who is awake and youngest as the target user.

4. The reproduction apparatus according to claim 3, wherein
   the at least one processor is configured to select a user who is awake and second youngest as the target user when a state of the target user has changed to sleeping.

5. The reproduction apparatus according to claim 3, wherein
   the at least one processor is configured to select a user who has changed from sleeping to awake as a new target user when the user who has changed to awake is younger than the target user.

6. The reproduction apparatus according to claim 1, wherein
   the at least one processor is configured
      to suspend reproduction of the content and store a point of suspension when the user selected as the target user has changed from awake to sleeping, and
      to reproduce the content from the stored point of suspension when the user returns from sleeping to awake and is again selected as the target user.

7. The reproduction apparatus according to claim 1, the reproduction apparatus comprising a communication instrument configured to communicate with a wearable terminal wearable on each of the plurality of users, wherein
   the communication instrument is configured to receive state information transmitted from the wearable terminal, the state information indicating whether the user who wears the wearable terminal is sleeping or awake, and
   the state memory is configured to store the states of the plurality of users based on the state information.

8. The reproduction apparatus according to claim 1, the reproduction apparatus comprising a communication instrument configured to communicate with a wearable terminal wearable on each of the plurality of users, wherein
   the communication instrument is configured to receive biological information of the user who wears the wearable terminal, the biological information being transmitted from the wearable terminal, and
   the at least one processor is configured to determine whether the plurality of users are sleeping or awake based on the biological information.

9. The reproduction apparatus according to claim 1, the reproduction apparatus comprising a display, wherein
   the at least one processor is configured to have the display show information for identifying the target user.

10. The reproduction apparatus according to claim 1, the reproduction apparatus comprising a display, wherein
    the at least one processor is configured to have the display show the states of all of the plurality of users.

11. The reproduction apparatus according to claim 1, wherein
    the content is provided in a real-time broadcast service, and
    while a content corresponding to the target user is being broadcast, the at least one processor is configured to receive and reproduce the content.

12. The reproduction apparatus according to claim 1, wherein
the at least one processor is configured to set genres corresponding to the plurality of users and to reproduce a content in a genre corresponding to the target user.

13. The reproduction apparatus according to claim 1, wherein
the at least one processor is configured to set genres corresponding to the plurality of users,
the content is provided in a real-time broadcast service, and
while a content in a genre corresponding to the target user is being broadcast, the at least one processor is configured to receive and reproduce the content.

14. The reproduction apparatus according to claim 1 being included in a car navigation apparatus.

15. The reproduction apparatus according to claim 1 being included in a portable terminal.

16. The reproduction apparatus according to claim 1, the reproduction apparatus comprising a communication instrument configured to communicate with a plurality of portable terminals, wherein
the plurality of portable terminals are configured to communicate with wearable terminals wearable on the plurality of users, respectively,
the portable terminal is configured to receive state information indicating whether the user wearing the wearable terminal is sleeping or awake, the state information being transmitted from the wearable terminal, and to transmit the state information to the reproduction apparatus,
the communication instrument is configured to receive the state information transmitted from the portable terminal, and
the state memory is configured to store the states of the plurality of users based on the state information.

* * * * *